March 20, 1934.　　　　B. A. OAS　　　　1,951,527
COMBINATION TOURIST AND PICNIC BAG AND BLANKET
Filed June 18, 1931　　　5 Sheets-Sheet 1
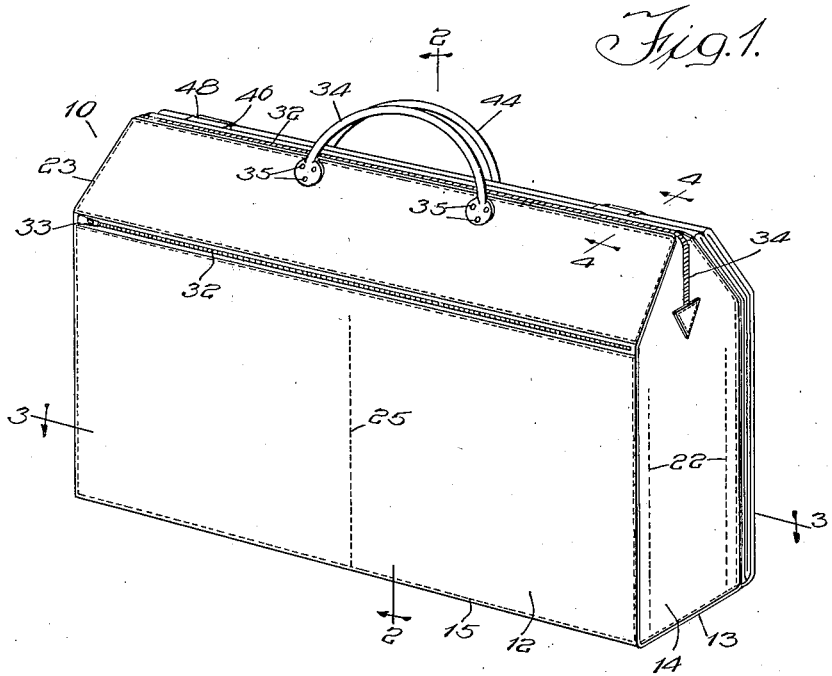
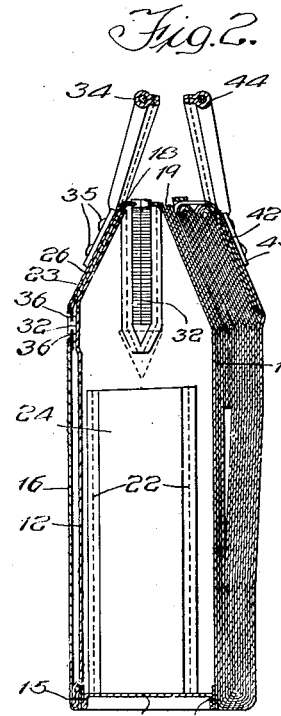
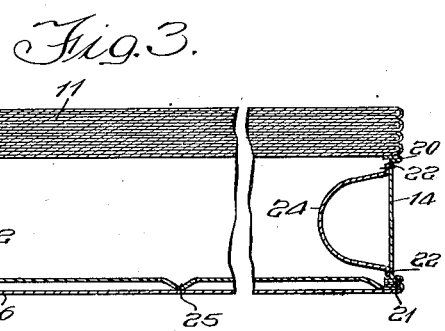
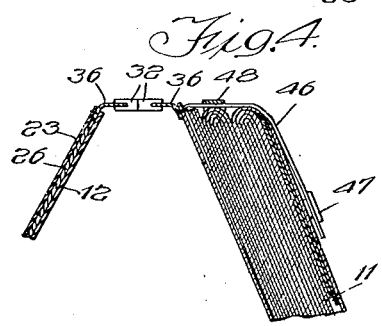
Inventor
Bernt A. Oas March 20, 1934. B. A. OAS 1,951,527
COMBINATION TOURIST AND PICNIC BAG AND BLANKET
Filed June 18, 1931 5 Sheets-Sheet 2

Witness:
William P. Kilroy

Inventor:
Bernt A. Oas
By Hief. Hief
Attys

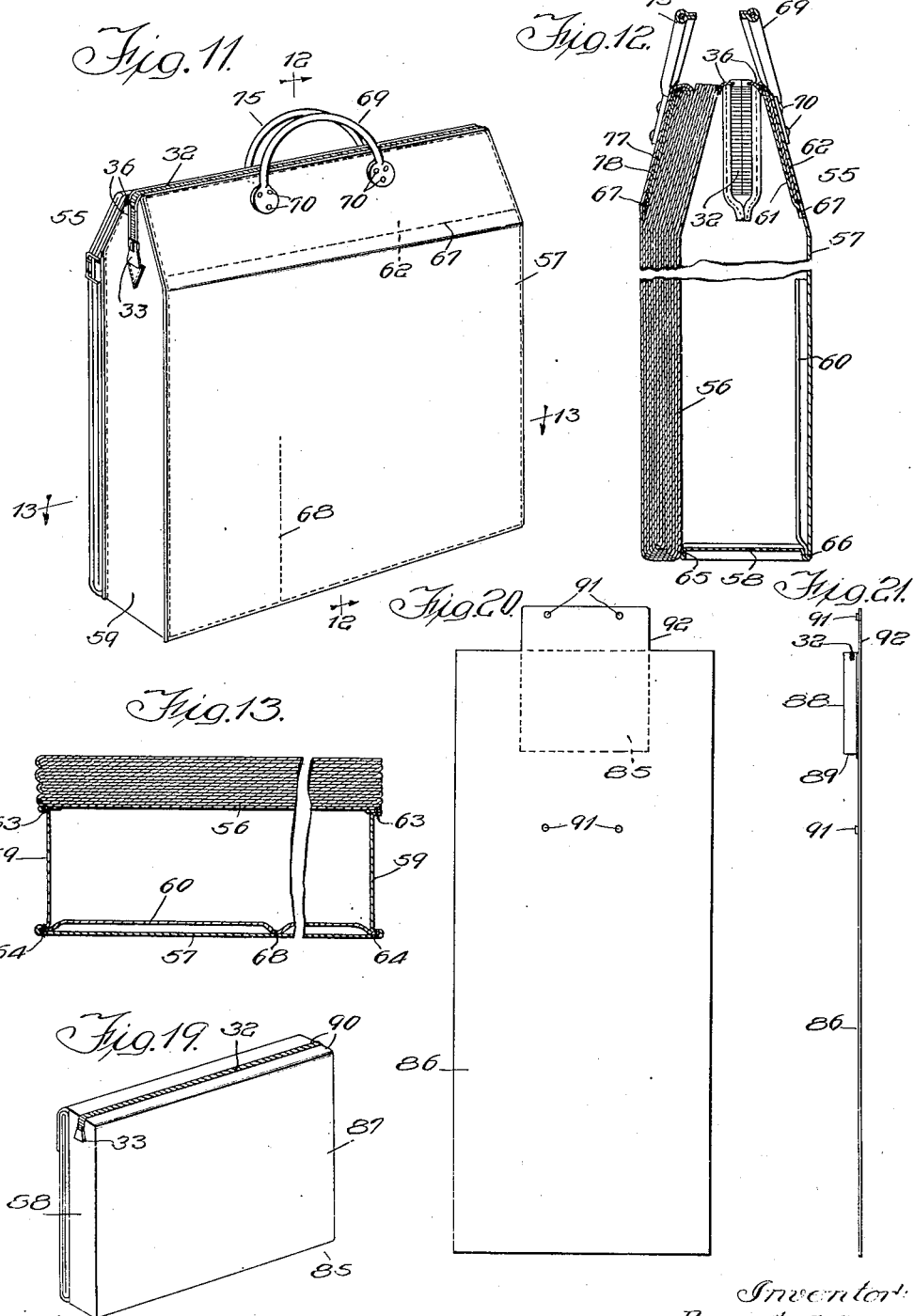

March 20, 1934. B. A. OAS 1,951,527
COMBINATION TOURIST AND PICNIC BAG AND BLANKET
Filed June 18, 1931 5 Sheets-Sheet 4
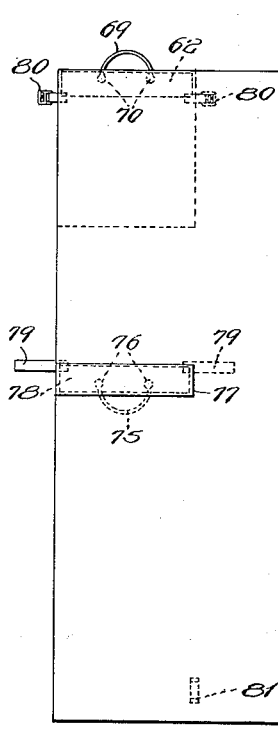
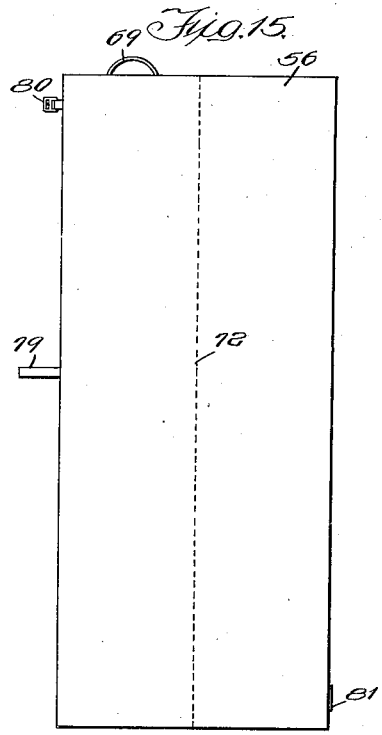
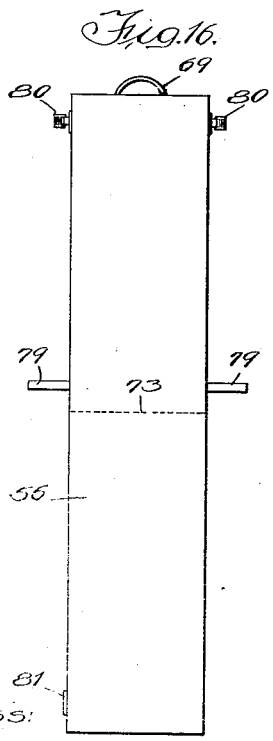
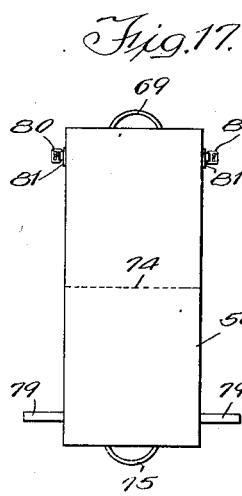
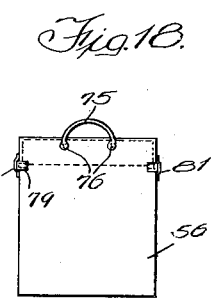
Inventor
Bernt A. Oas March 20, 1934.　　　　B. A. OAS　　　　1,951,527

COMBINATION TOURIST AND PICNIC BAG AND BLANKET

Filed June 18, 1931　　　5 Sheets-Sheet 5

Witness:
William P. Kilroy

Inventor
Bernt A. Oas

Patented Mar. 20, 1934

1,951,527

UNITED STATES PATENT OFFICE 1,951,527

COMBINATION TOURIST AND PICNIC BAG AND BLANKET

Bernt A. Oas, Chicago, Ill.

Application June 18, 1931, Serial No. 545,262

3 Claims. (Cl. 190—42)

The invention relates to packs or bags and more particularly it relates to an article that combines the several uses of bag, pad, cloth, blanket and the like.

The invention contemplates the provision of an article especially adapted for use as a pack or a bag by picnic and tourist parties while travelling and which by a quick and easy transformation may be utilized either as a lunch cloth or as a blanket or pad to spread upon the ground to sit or recline upon.

An object of the invention is the provision of an article comprising a sheet of material approximately corresponding in size to a blanket and having one or more collapsible containers or receptacles attached to the sheet in such a manner that the sheet may be folded in contact with the receptacle and the folded article simulate and be utilized as a travelling bag.

Still another object of the invention is the provision of an article capable of being folded and assembled to form a travelling bag or similar receptacle having a plurality of pockets and which when so assembled may by a few manual manipulations be unfolded to take the form of a sheet or of a pad of substantially uniform thickness.

A still further object of the invention is the provision of a unitary article capable of manual manipulation to take on a plurality of forms, each adapted to one or more of a variety of uses.

Still another object of the invention is the provision of an article easily manipulated to adapt it for use for a plurality of purposes during an outing or picnic and which is simple in construction, of low cost, easy to manufacture, and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a perspective view of one embodiment of the invention as it appears when assembled to provide a closed handbag;

Fig. 2 is a sectional view along the line 2—2 of Fig. 1 and drawn to a larger scale;

Fig. 3 is a sectional view along the line 3—3 of Fig. 1;

Fig. 4 is a sectional view along the line 4—4 of Fig. 1 drawn to a larger scale;

Fig. 11 is a perspective view of another embodiment of the invention as it appears when assembled to provide a closed hand or travelling bag;

Fig. 12 is a view along the line 12—12 of Fig. 11 drawn to a larger scale with a portion broken away;

Fig. 13 is a view along the line 13—13 of Fig. 11 drawn to a larger scale and with a portion broken away;

Fig. 14 is a view of the article shown in Fig. 11 following its manipulation and unfolding to transform the article into a sheet of substantially uniform thickness;

Fig. 15 is a view of the article as it appears after folding the same along the dotted line of Fig. 14;

Fig. 16 is a view of the same as it appears upon folding along the dotted line of Fig. 15;

Fig. 17 is a view of the article as it appears after folding along the dotted line of Fig. 16;

Fig. 18 is a view of the same as it appears upon folding along the dotted line of Fig. 17;

Fig. 19 is a perspective of still another embodiment of the invention as it appears when folded to simulate and serve as a hand or travelling bag;

Fig. 20 is a view of the embodiment shown in Fig. 19 after its manipulation and unfolding to transform the bag into a sheet of substantially uniform thickness;

Fig. 21 is an edge view of the unfolded article shown in Fig. 20; and

Figure 5:
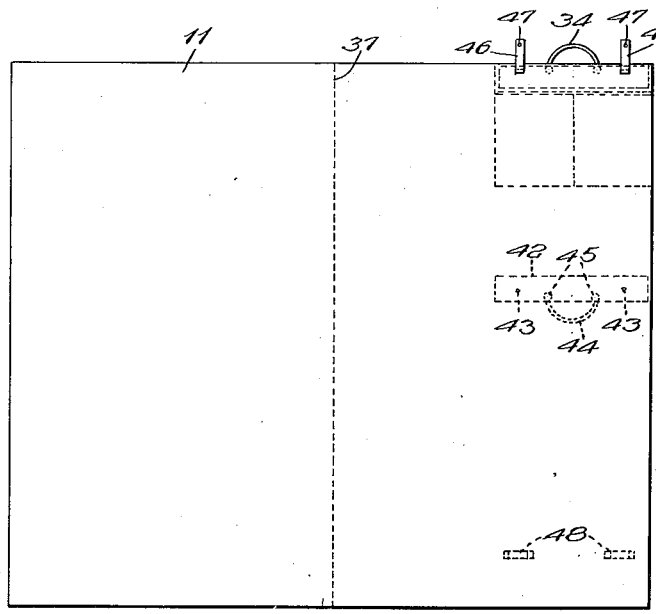
Fig. 5 is a view of the article shown in Fig. 1 after its manipulation and unfolding to transform the same into a sheet or pad of substantially uniform thickness.

Referring now more particularly to the drawings, one form of the invention is illustrated in Fig. 1 as embodied in a device generally designated by the numeral 10. The device comprises a main sheet 11 of canvas or other suitable flexible material shown in unfolded position in Fig. 5. One corner of the sheet 11 has a plurality of relatively small sheets fastened thereto and assembled and sewed together to provide a receptacle of the general shape and size of a travelling bag. The small sheets include an inner side sheet 12, upper and lower side sheets 23 and 16 respectively, end sheets 14 and a bottom sheet 13.

One edge of the bottom sheet 13 is fastened to the main sheet 11 by a row of stitches 17 and the other edge of the sheet 13 is connected with the adjacent edges of the sheets 12 and 16 by a row of stitches 15. The end sheets 14 are connected along one edge with the main sheet 11 by rows of stitches 20 and at the other edge the sheets 14 are connected with the side sheets 12 and 16 by rows of stitches 21.

End compartments are formed in the bag by fastening sheets 24 to the end sheets 14 by rows of stitches 22. The side sheets 16 and 12 are fastened together near their mid-portion by a vertical row of stitches 25 to divide the space between the sheets and provide a pair of side pockets or compartments. The upper edge of the outside sheet 16 terminates at some distance below the top of the bag and the intervening space is filled by a relatively narrow sheet of material 23. A thin plate 26 of cardboard, leather, or similar material is positioned between the sheet 12 and the sheet 23 to give rigidity to the upper side wall of the bag. A handle 34 is fastened to the bag by a plurality of rivets 35 extending through the sheets 12 and 23, and the plate 26. The space between the lower edge of the sheet 23 and the upper edge of the sheet 16 provides a slit opening for access to the pockets bounded by the sheets 12 and 16. Any suitable means may be utilized to close the slit or space between the sheets 23 and 16 and in the drawings I have illustrated a closure member comprising a row of hook fasteners 32 mounted on tapes 36 bounding each side of the opening. The fasteners 32 are operable to open and closed position by a sliding device 33 both the fastener and the device being of a well-known construction.

The space between the adjoining upper edges of the sheet 11 and of the sheets 23 and 12 provides an opening making the interior of the bag accessible. A closure device similar to that already described for the opening between the sheets 23 and 16 is fastened to the sheets 11 and 12 by stitches 19 and 18 respectively and permits access to the interior of the main body of the bag and the pockets formed therein by the end members 24.

Figure 6:
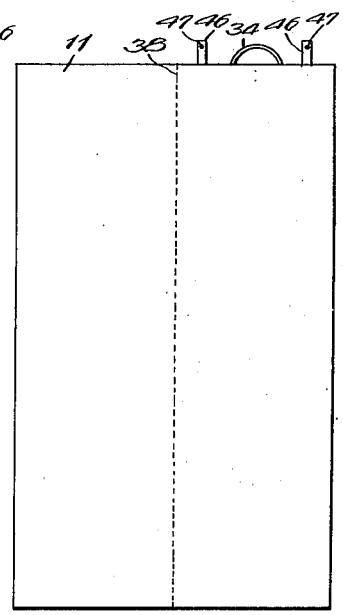
Fig. 6 is a view of the article shown in Fig. 5 upon folding the same along the dotted line.
Figure 7:
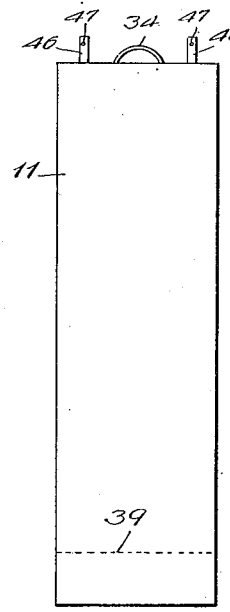
Fig. 7 is a view of the same after folding along the dotted line of Fig. 6.
Figure 8:
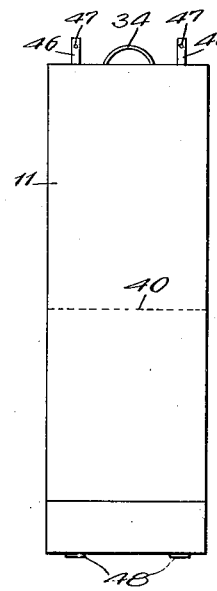
Fig. 8 is a view of the article as it appears upon folding along the dotted line of Fig. 7.
Figure 9:
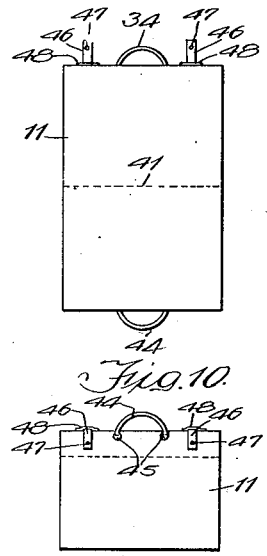
Fig. 9 is a view of the same as it appears following its folding along the dotted line of Fig. 8.
Figure 10:
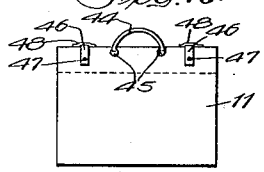
Fig. 10 is a view of the article as it appears upon being folded along the dotted line of Fig. 9.

The main body portion of the sheet 11 which extends beyond the boundaries of the bag is folded to conform to such boundaries and the folded portion is positioned on one side of the bag. The sheet 11 is folded first along the line 37 of Fig. 5 and thereby takes the form shown in Fig. 6. It is again folded along the line 38 of Fig. 6 to the form indicated by Fig. 7. It is next folded along the line 39 of Fig. 7 to the form shown in Fig. 8. The sheet is again folded along the line 40 of Fig. 8 to take the form shown in Fig. 9 and is folded still another time along the line 41 following which the sheet occupies the folded position best shown in Figs. 2, 3, and 4.

A relatively thin plate 42 is fastened by rivets 43 to the underside of the sheet 11 as observed in Fig. 5. The plate 42 provides a rigid connection for a handle member 44, fastened to the plate by rivets 45. The handle member 44 is so positioned that when the device is folded along the line 41, it will be in closely spaced relation to the handle member 34. A pair of straps 46, fastened on the sheet 11 one on each side of the handle member 34, extend downwardly over the upper edges of the folds of the sheet and are fastened in position by snaps 47. A pair of straps are suitably mounted on the sheet 11 to provide loops 48 through which the straps 46 are inserted to hold the folded portion of the sheet against movement. The bag or receptacle portion of the device is so constructed that it collapses and flattens out underneath the sheet 11 when the latter is unfolded as in Fig. 5. The collapsed bag is sufficiently thin and of such slight bulk that the unfolded sheet 11 can be utilized as a pad or a blanket to sit or recline upon or as a cloth upon which viands may be spread.

An alternative embodiment of the invention is shown in Figs. 11 to 18 inclusive. In this form the invention comprises a bag generally designated by the numeral 55 and a main sheet 56. The bag or the receptacle portion of the device comprises a side sheet 57, a bottom sheet 58 end sheets 59 and a lining for the side sheet 57 comprising a lower sheet 60 and an upper sheet 61.

The end sheets 59 are fastened at one edge to the main sheet 56 by lines of stitches 63 and at their other edge they are fastened to the sheets 57 and 60 by lines of stitches 64. The bottom sheet 58 has one edge fastened to the sheet 56 by a line of stitches 65 and its other edge is fastened to the sheets 60 and 57 by a line of stitches 66.

The upper portion of the side wall of the bag 55 is given rigidity by positioning a plate 62 between the sheets 57 and 61. The lower edge of the sheet 61 is fastened to the sheet 57 by a line of stitches 67. The sheets 60 and 57 are tacked together intermediate their ends by a line of stitches 68 the space between the sheets thereby providing a pair of pockets as best shown in Fig. 13.

A handle 69 is fastened to the upper edge of the outside portion of the bag by a plurality of rivets 70 extending through the three plies comprising the sheet 57, the plate 62 and the sheet 61.

The device is shown in plan in Fig. 14 with the sheet 56 unfolded and with the material comprising the bag underneath one corner of the sheet. The sheet 56 is folded along the line 71 to take the form shown in Fig. 15 and is again folded along the line 72 of Fig. 15 to form Fig. 16. The sheet 56 is folded along the line 73 of Fig. 16 to take the form shown in Fig. 17, the latter being folded along the line 74 to take the form shown in Figs. 11 and 18.

A narrow strip of material 77 is fastened to the sheet 56 as shown in Fig. 14 and a reenforcing plate 78 is placed between the sheet 77 and the sheet 56. A handle 75 is fastened to the sheet 56 by means of rivets 76 which extend through the sheet 77 and the plate 78.

The sheet 56 is held in its folded position by a pair of straps 79 so positioned on the sheet as to be insertible through a pair of buckles 80 when the sheet is folded. Straps are positioned near the end of the sheet 56 to provide loops 81 through which the straps 79 are inserted to assist in holding the folded portion of the sheet in exact alignment with the bag proper when the device is given the form shown in Figs. 11 and 12. The folded portion of the sheet 56 when so positioned gives the device the general form and appearance of a travelling bag. The handle 75 is so positioned that when the folding operation is complete it is contiguous to the handle 69 which is attached to the bag proper.

The top portions of the side walls of the bag are not sewed together and as a result there is a top opening giving access to the bag. The boundaries of this opening have a border comprising a tape 36 to which a plurality of hook fasteners 32 are connected at one end. The fasteners 32 are opened and closed by a sliding device 33 in the same manner as described for the closure member of the embodiment shown in Fig. 1. The bag 55 is capable of being collapsed when empty and is sufficiently thin when flattened out as in Fig. 14, that it does not interfere with the use of the sheet 56 as a blanket, pad, cloth or the like.

Still another embodiment of the invention, shown in Figs. 19 to 21 inclusive, comprises a sheet 86 having a bag 85 formed on one end. The bag 85 comprises a side sheet 87, end sheets 88, a bottom sheet 89 and a top sheet 90 suitably fastened together by stitches, not shown. The sheet 86 is folded to dimensions conforming to the boundaries of the bag 85 as best shown in Fig. 19 and is firmly held in folded position by means of a projection 92 from the top sheet 90. Snaps 91 hold the flap 92 in closed position.

The top sheet 90 has a slit like opening extending its full length which is closed by fastenings 32 operable by a sliding device 33 in the same manner as in the embodiments already described. This construction is relatively simple and is preferably of smaller dimensions than the constructions already described. The device when folded is of a size easy to carry underneath the arm and for this reason handle members are not shown.

Figure 22:
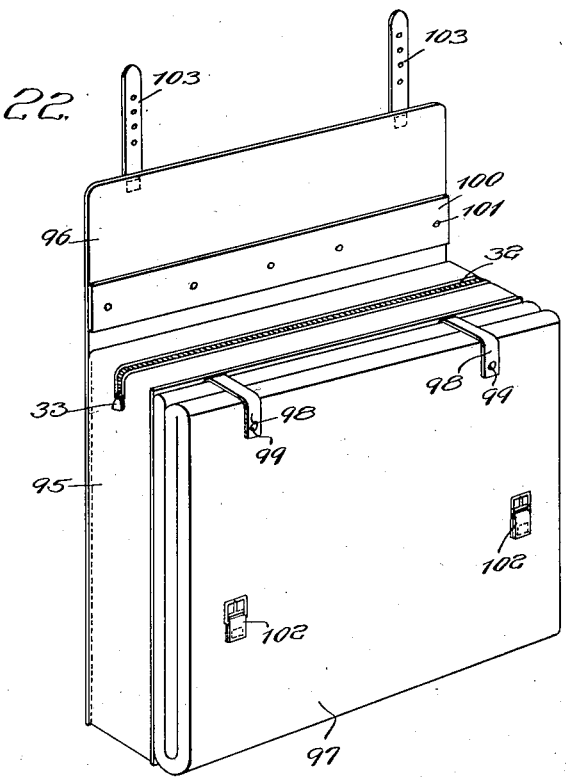
Figs. 22 and 23 are respectively perspective and top plan views of still another embodiment of the invention.
Figure 23:
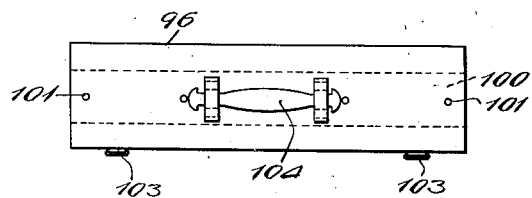

Figs. 22 and 23 illustrate still another embodiment of the invention wherein a bag 95 suitable for use as a brief case has a sheet 97 forming one side wall. The sheet 97 may be folded to the form shown in Fig. 22, wherein the bag and sheet have the general appearance of a brief case having outside pockets.

The side wall of the bag opposite to the sheet has a top projection 96 which serves as a flap or cover with straps 103 positioned to engage buckles 102 suitably positioned on the sheet 97. The sheet 97 is held in its folded position as shown by straps 98 fastened at one end to the side wall of the bag and at their other end the straps are fastened to the outer folded portion of the sheet by snaps 99. A reenforcing strip 100 is fastened to the inner face of the projecting flap 96 by rivets 101. A handle 104, fastened to the outside of the flap 96, is centrally positioned in the top of the bag when the flap is closed. The bag 95 has a slit opening in its top which is closed by fasteners 32 operable by a sliding device 33 similar in construction to those shown and described in connection with other embodiments of the invention. This form of the invention not only simulates a brief case with outside pockets but by reason of its dimensions is particularly adapted for carrying legal and other documents if desired. The capacity of the bag is such that it is adapted for the use of small touring and picnic parties.

The material used in the device may comprise any suitable fabric capable of folding without breaking and in practice canvas, ducking and the like has been found to give the requisite durability and provides an article of pleasing appearance. The devices when unfolded as shown in Figs. 5, 14 and 20 are capable of being utilized as a cloth, pad or blanket meeting the requirements of picnic and tourist parties. The surface of the sheets in contact with the ground are preferably waterproofed with material permitting the sheet to be folded without breaking the waterproofing. The bags proper are of such capacity as to meet the demands of tourists and of picnic parties and are sufficiently large to hold bulky articles such as viands and the like which are usually carried by such parties.

Thus it will be seen that I have provided a device of the kind described which is suitable for a variety of uses and can be manufactured at relatively low cost and by reason of its easy manipulation is suitable for use on outings by all classes of people including persons inexperienced in camping or travelling.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. An article of the class described comprising a relatively large sheet of material, material fastened to said sheet to provide a pocket having its open end substantially coincident with one edge of said sheet, means for fastening said sheet in folded juxtaposition to one side of the pocket, and means providing a closure member for the open end of the pocket, said closure means having a slit formed therein and means operable to open and close said slit.

2. An article of the class described comprising a relatively large sheet of material, material fastened to said sheet to provide a pocket having its open end substantially coincident with one edge of said sheet, means for fastening said sheet in folded juxtaposition to one side of the pocket, means providing a closure member for the open end of the pocket, said closure means having a slit formed therein, means operable to open and close said slit, and means providing a handle at the top of said pocket when said sheet is in said folded juxtaposition.

3. An article of the kind described comprising a relatively large sheet of material, material fastened to said sheet to provide a pocket having its open end substantially coincident with one edge of the sheet, one side of said pocket being extended to provide a closure flap for the pocket, said material being adapted to be folded to form a plurality of layers arranged in juxtaposition to the pocket, means adapted to fasten the flap to the outermost layer of said folded sheet when the flap is in closed position, said flap thereby holding the sheet in said folded juxtaposition, and having a slit opening into the pocket, and means operable to open and close the slit.

BERNT A. OAS.